Mar. 3, 1925.
J. B. TAYLOR
1,528,348
METHOD AND APPARATUS FOR TRANSFERRING DUST
Filed Dec. 8, 1923
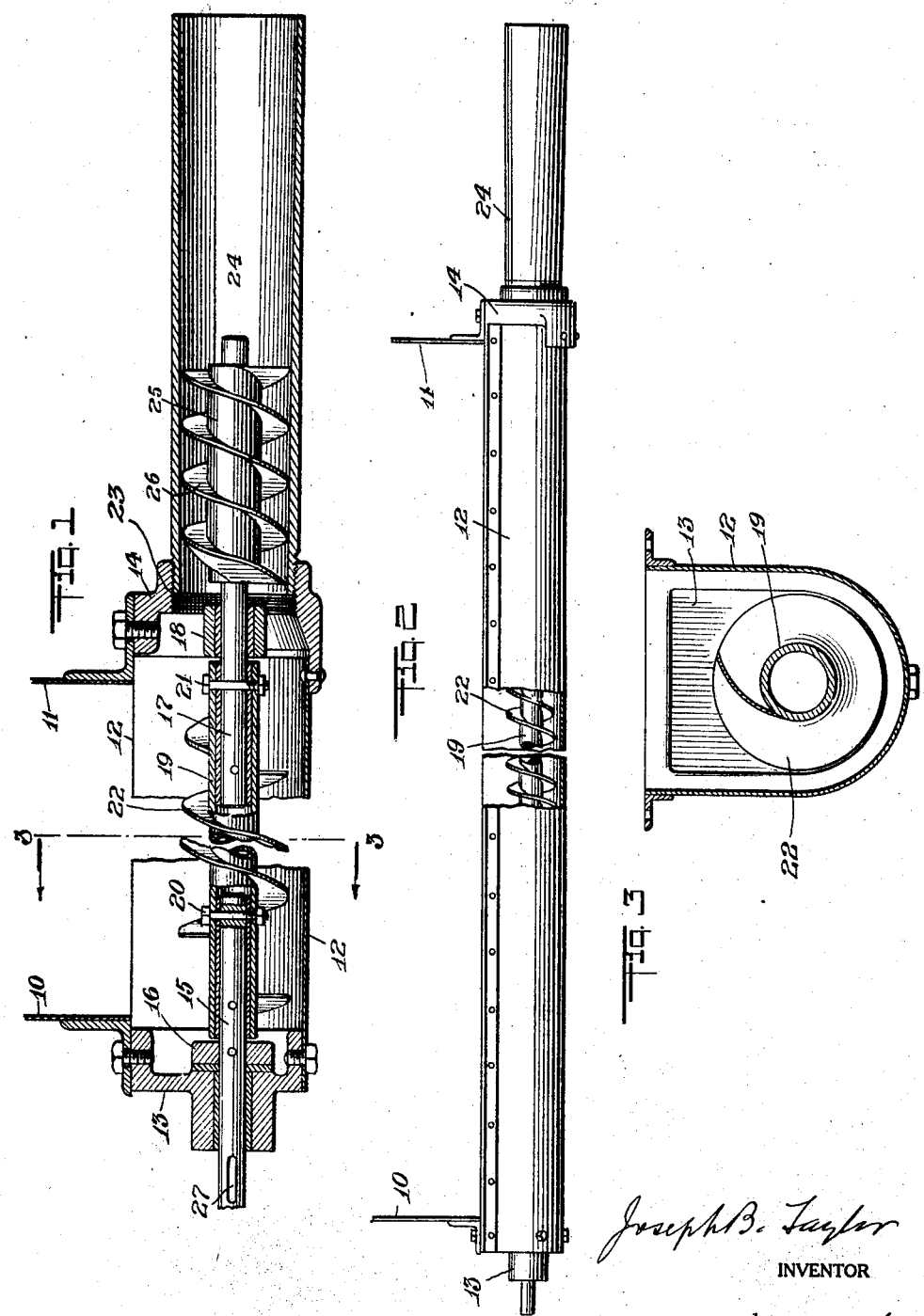
Joseph B. Taylor
INVENTOR
BY H. Mackey
ATTORNEY Patented Mar. 3, 1925.

1,528,348

UNITED STATES PATENT OFFICE.

JOSEPH B. TAYLOR, OF ALLENDALE, NEW JERSEY.

METHOD AND APPARATUS FOR TRANSFERRING DUST.

Application filed December 8, 1923. Serial No. 679,325.

*To all whom it may concern:*

Be it known that I, JOSEPH B. TAYLOR, a citizen of the United States, residing in Allendale, Bergen County, State of New Jersey, have invented a certain Improvement in Methods and Apparatus for Transferring Dust, of which the following is a specification.

The present invention relates to an improved process and apparatus for conveniently discharging and transferring fine dust, as well as for preparing the same for transportation and handling without waste.

Machines of various kinds are in use for separating and collecting dust from air and gas currents in many arts. In all of these machines the air or gas from which the dust is collected is in motion, and there always exists a difference of pressure in different parts of the machine, as well as a difference between the pressures existing within the machine and the external atmospheric pressure.

Owing to these conditions it has not been possible finally to remove or discharge from the machine the dust collected during operation of the machine, without disturbing the proper working conditions within the apparatus.

Another difficulty met with in dust collecting apparatus, more particularly when the dust is so valuable that it is worth while to reclaim it, is that in most instances this dust is so exceedingly fine and is so mixed with air that it floats away in the air when disturbed, and the problem of successfully handling it becomes almost insolvable.

The present invention provides a method of and means for extracting dust from the bins of dust collecting machines of all kinds continuously and during the operation of the machine, while entirely avoiding all danger of admitting external air or otherwise disturbing normal operation. At the same time my invention supplies a method of and means for making the finest dust amenable to easy handling after its discharge from the collector. It is to be understood, therefore, that the apparatus herein described is not necessarily connected with nor does it necessarily form a part of a dust collecting or separating machine.

The apparatus is shown in a simple form selected by way of example in the accompanying drawings, wherein Figure 1 is a longitudinal section of a single transferring and consolidating unit shortened in order to get it on the sheet, Figure 2 is a side elevation of the same similarly shortened and partly broken away, and Figure 3 is a transverse sectional view taken on the line 3—3 in Figure 1.

In these drawings, the apparatus in question is supposed to be situated at the bottom of a tapering dust bin of any well known character, the end walls of which are indicated at 10 and 11, Any number of units like that illustrated can be employed, being generally placed in parallel position.

The transferring unit comprises an extended pocket or casing 12 having a rounded bottom and open at the top to receive the dust from the collecting bin at the bottom of which it is placed.

The ends of the pocket 12 fit into and are supported by two cast iron sockets 13 and 14, secured to the walls 10 and 11 as shown. The socket 13 carries a stub-shaft 15 mounted to turn in a long bearing of any appropriate character, and provided with a thrust block, indicated at 16. A second shaft 17, in line with 15, is revolubly mounted in a bearing 18 extending across the socket 14.

The two shafts 15 and 17 fit into the ends of the hollow main shaft 19 and are secured thereto by pins 20, 21, or otherwise. The shaft 19 extends the whole length of the pocket 12, and along practically its entire length extends the helix 22.

The outer end of the socket 14 has a threaded circular opening 23 into which is screwed the sealing and compressing tube 24. The outer end of the shaft 17 carries an enlargement 25, along which extends a second relatively stout and powerful helix 26, preferably cast in one piece with the shaft 17 and the enlargement 25. This helix only extends part way along the interior of the compressing tube 24, as shown in Figure 1.

In practice the mass of dust to be discharged fills the pocket 12 and submerges the helix 22, thus completely closing the opening in the socket 14. The expulsion of the dust is primarily accomplished by revolving the interior helix 22 in such a direction as to push those portions of the dust mass within its influence out through the socket 14 into the tube 24, where the compressing helix 26 passes it on toward the outer end of said tube. In this manner the dust mass itself forms a permanent seal, excluding the outer air from the pocket 12 and the bin or bins which empty into it, and as a result, the expulsion of the dust can be carried on continuously without the necessity of stopping the dust separator to remove the dust.

The purpose of extending the tube 24 well beyond the end of the helix 26 is not alone to insure a deep and effective seal, but it has been found that, as the light dust filled with air passes out away from the helix 26, being constantly pushed forward by the dust behind it, the mass fills the tube 24 completely and its friction opposes the action of the helix 26 so strongly that the result is a powerful compression of the dust mass, whereby the air is very largely forced out of it; so that as it finally leaves the end of the tube 24, it is sufficiently heavy and compacted to be capable of easy handling without appreciable loss from floating in the air.

Indeed this resistance of the dust through friction against the inside of the tube 24 would act to stop the helix 26 altogether, if the tube 24 were not slightly expanded outwardly, as shown in the drawings. The degree of taper will depend upon the character of material treated and the degree of compression desired, and my invention is, of course, not limited to any particular amount of taper. In the treatment of cement dust, for instance, I have successfully used a helix, 26, four inches in diameter, and, using a tube 24 that projected eighteen inches beyond this helix, I have made the tube one eighth of an inch wider at its outer end than around the helix. These dimensions are given merely by way of example.

The driving of the shafts 15, 17 and 19 may, of course, be accomplished by a great variety of means familiar to those skilled in mechanics, and the driving means may be applied to either end. In Figure 1 I have shown at 27 a key-way for attaching a driving pulley on the outer end of the stub shaft 15, for this purpose, merely by way of example.

Many changes may be made in this apparatus without departing from the scope of the invention, which is not limited to the details herein shown and described.

What I claim is—

1. The process of making dust fit for effective handling which consists in forcing the same forward in a slightly expanding open ended stream, whereby frictional resistance is made available to create a constant pressure for the expelling of the contained air or gas.

2. Means for compressing dust to expel the air therefrom in a uniform and continuous manner, comprising screw conveyor and a slightly flaring tube surrounding the same and extending beyond the end of the screw.

In testimony whereof I have hereto set my hand on this 6th day of December, 1923.

JOSEPH B. TAYLOR.